United States Patent [19]
Jubre et al.

[11] Patent Number: 5,460,480
[45] Date of Patent: Oct. 24, 1995

[54] INSTALLATION FOR HANDLING THE CONVEYANCE OF BLANKS FROM A CUTTING MACHINE TO A STACKING DEVICE

[75] Inventors: Bernard Jubre, Villeneuve d'Ascq; Eric Humbert, Wavrin; Bernard Puche, Phalempin, all of France

[73] Assignee: Dujardin-Montbard-Somenor Z. I. Lille Seclin, Seclin Cedex, France

[21] Appl. No.: 54,772

[22] Filed: Apr. 27, 1993

[30] Foreign Application Priority Data

Apr. 29, 1992 [FR] France ................... 92 05315

[51] Int. Cl.⁶ ................................. B65G 57/03
[52] U.S. Cl. ...................... 414/793.2; 414/794.4; 414/788.9
[58] Field of Search .............. 414/793.2, 793.3, 414/794.4, 797.1, 788.9

[56] References Cited

U.S. PATENT DOCUMENTS

| Re. 28,551 | 9/1975 | Breitbach | 414/793.3 |
| 1,892,590 | 12/1932 | Steele et al. | 414/793.3 |
| 3,727,758 | 4/1973 | Cleland | 414/793.3 |
| 3,831,780 | 8/1974 | Skarin et al. | 414/793.3 |
| 3,977,537 | 8/1976 | Buccione | 414/793.3 |
| 4,578,860 | 4/1986 | Tanaka | 414/793.3 |

FOREIGN PATENT DOCUMENTS

| 2589453 | 5/1987 | France | 414/793.2 |
| 8805599 | 11/1989 | France . | |
| 1078503 | 3/1960 | Germany | 414/793.2 |

*Primary Examiner*—Michael S. Huppert
*Assistant Examiner*—Gregory A. Morse
*Attorney, Agent, or Firm*—Collard & Roe

[57] ABSTRACT

An installation for handling the conveyance of a blank from a cutting machine to a stacking device has at least one cyclically operable conveyor programmed to convey the blank from the cutting machine to a position above the stacking device and to stop in this position before releasing the blank. A carriage supporting a gripping arm is connected to the conveyor for pulling the blank out of the cutting machine and for moving the pull-out blank to the stacking device with the conveyor.

9 Claims, 4 Drawing Sheets

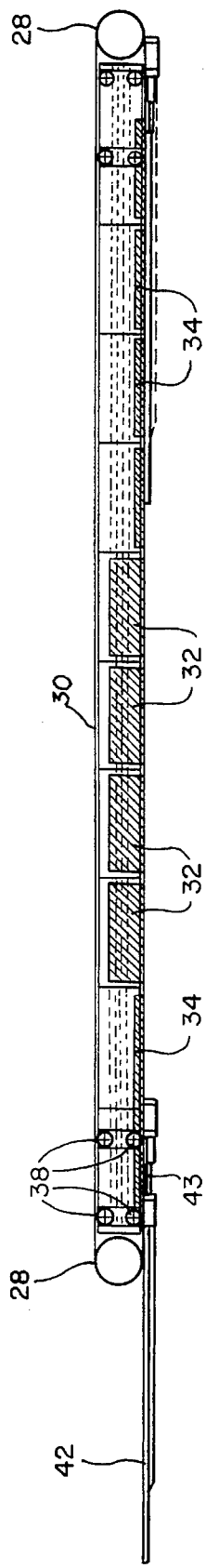
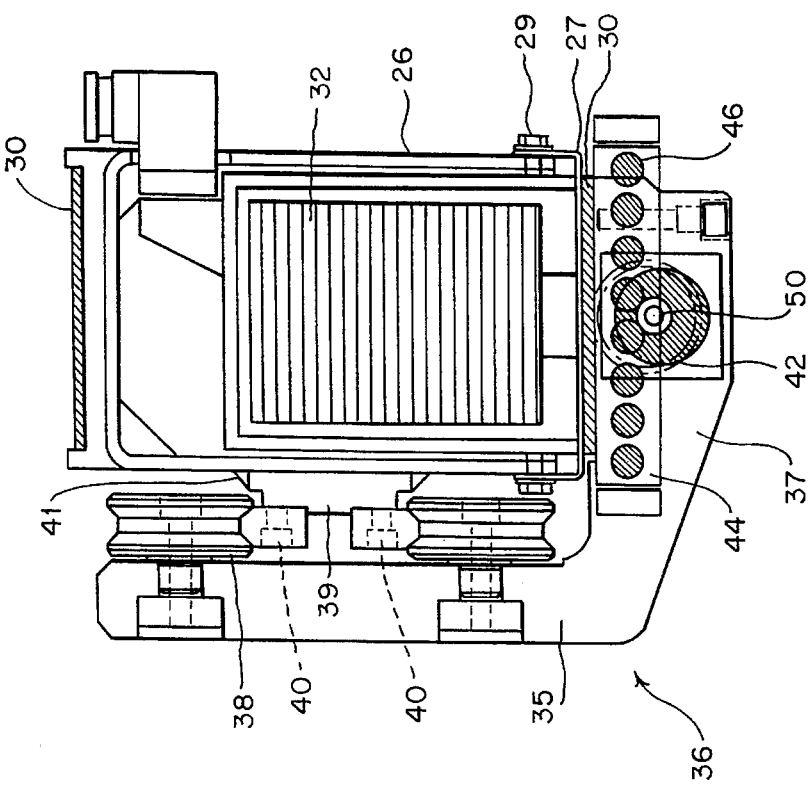
FIG. 3
FIG. 4

INSTALLATION FOR HANDLING THE CONVEYANCE OF BLANKS FROM A CUTTING MACHINE TO A STACKING DEVICE

BACKGROUND OF THE INVENTION

1. Field of the Invention

The present invention relates to an installation for handling the conveyance of a blank from a cutting machine to a stacking device, the cutting machine having a discharge table extending in a plane, comprising at least one cyclically operable conveyor programmed to convey the blank from the discharge table to a position above the stacking device and to stop in this position before releasing the blank. This invention is particularly applicable to cutting machines wherein blanks are cut from strips, especially sheet metal strips, by means of shears or in a stamping press.

2. Description of the Prior Art

Generally speaking, blanks coming from a cutting machine are conveyed to a stacking device by gravity, for example by gliding along an inclined plane, or by a continuously operating conveyor, for example a magnetic conveyor band which picks up the blanks on the discharge table of the cutting machine and releases them above the stacking device.

To avoid damaging the blanks by friction on the conveyors and/or impacts against stops and guides of the stacking device, French patent No. 88.05599 has proposed conveying the blanks by means of a cyclically operating conveyor whose cycle is the same as that of the cutting machine and whose path is equal to, or a multiple of, the distance between the cutting machine and the stacking device, and to permit the blanks to be released on the stacking device when the conveyor is stopped. To assure the exact alignment of the blank above the stacking device when the conveyor is stopped, it is necessary for the position of the blank on the discharge table of the cutting machine to be always the same when it is seized by the conveyor and that the blank is seized always at the same instant of the operating cycle of the conveyor. This requires a very precise synchronism between the feeding cycles of the cutting machine and the operating cycles of the conveyor. This synchronism cannot always be realized with the desired precision, particularly when retrofitting existing cutting machines.

SUMMARY OF THE INVENTION

It is the primary object of the invention to dispense with this requirement and to permit a proper operation of the installation even if the successive operating cycles of the feeding mechanism of the cutting machine are not exactly identical. It is another object of the present invention to facilitate the retrofitting of stacking devices in an existing plant.

The above and other objects are accomplished in an installation of the first-described type according to this invention by connecting means to the conveyor for removing the blank from the cutting machine and for moving the removed blank to the stacking device with the conveyor.

Since the blank remains positively connected to the conveyor during the entire path it traverses from the discharge table of the cutting machine to the stacking device, it can be led to the same position exactly above the stacking device simply by controlling the movement of the conveyor. Furthermore, the blank may be pulled out of the cutting machine either in the direction of the movement of the strip, as in conventional installations, or in a direction perpendicular thereto, which may facilitate the retrofitting of the stacking device in an existing plant.

The illustrated conveyor comprises a mobile element capable of traversing a path having one end closest to the cutting machine and an opposite end remote therefrom, and the blank removing means comprises an arm connected to the mobile element of the conveyor and having a free end, and a gripping element mounted on the free end of the arm for seizing the blank at an edge thereof when the mobile element is at the end of the path closest to the cutting machine. The gripping element may be mechanically, pneumatically or magnetically operable.

Preferably, the conveyor comprises an endless band having a lower course extending in a plane slightly above the plane of the discharge table of the cutting machine, and the mobile element is affixed to the lower endless band course and the arm extends therebelow in alignment with the plane of the discharge table, the conveyor further comprising means, i.e. magnetic means, actuatable for selectively holding the blank flat against the lower endless band course along at least a part of the path of the mobile element and for releasing the blank in this position above the stacking device. In this way, the blank is supported on the discharge table of the cutting machine when it is pulled out of the machine and is flat against the lower endless conveyor band course when it arrives thereunder.

In the illustrated embodiment, the conveyor comprises guide rails affixed thereto and extending therealong, and the mobile element is a carriage supporting the arm and displaceable on the guide rails. The carriage is of L-shaped cross section having a vertical leg and a horizontal leg, the conveyor comprises an elongated frame supporting the endless band and having opposite sides extending perpendicularly thereto and substantially parallel to the vertical leg of the carriage, the guide rails are affixed to one of the conveyor frame sides, the vertical carriage leg carries rollers rolling on the guide rails, and the horizontal carriage leg extends below the lower endless band course and supports the arm.

Advantageously, the gripping element mounted on the free end of the arm for seizing the blank at an edge thereof comprises magnets, for example electromagnets, arranged to contact the edge. A support for the magnets is displaceable longitudinally at the free end of the arm with respect thereto between a forward end position wherein the magnets contact the edge of the blank and seize the same and a retracted rest position.

For stacking blanks of considerable length, two or more conveyance systems may be used, each system being comprised of a cyclically operable conveyor and these conveyors extending parallel to each other and being programmed in synchronism to convey a respective one of the blanks from the discharge table to a position above the stacking device and to stop in this position before releasing the blank, and each one of the conveyors having the means for removing the blank from the cutting machine and for moving the removed blank to the stacking device. Some of the conveyors may be lacking the blank removing means and serve only to support the blank so as to avoid being subjected to significant deformations during conveyance.

If the duration of the operating cycle of the conveyor exceeds that of the cutting machine, two systems of the cyclically operable conveyors extending parallel to each other are programmed alternately to convey a respective one of the blanks from the discharge table to a position above the stacking device and to stop in said position before releasing the blank, each one of the conveyors having the means for removing the blank from the cutting machine and for moving the removed blank to the stacking device, and a lever system supports each conveyor for raising and lowering the conveyor. In this way, each conveyor can be raised after it has released the blank above the stacking device so that the gripping arm may be moved to a ready-position close to the cutting machine discharge table during the conveyance of another blank to the stacking device by the alternately operating conveyor system. The conveyors may, for example, be suspended from a portal by lever systems actuatable by jacks.

BRIEF DESCRIPTION OF THE DRAWING

The above and other objects, advantages and features of the invention will become more apparent from the following detailed description of a now preferred embodiment thereof, taken in conjunction with the accompanying, somewhat schematic drawing wherein

FIG. 3 is a side elevational view showing one of the coveyors of the installation;

FIG. 4 is an enlarged end view, partly in section, of the conveyor shown in FIG. 3;

DETAILED DESCRIPTION OF PREFERRED EMBODIMENT

Figure 1:
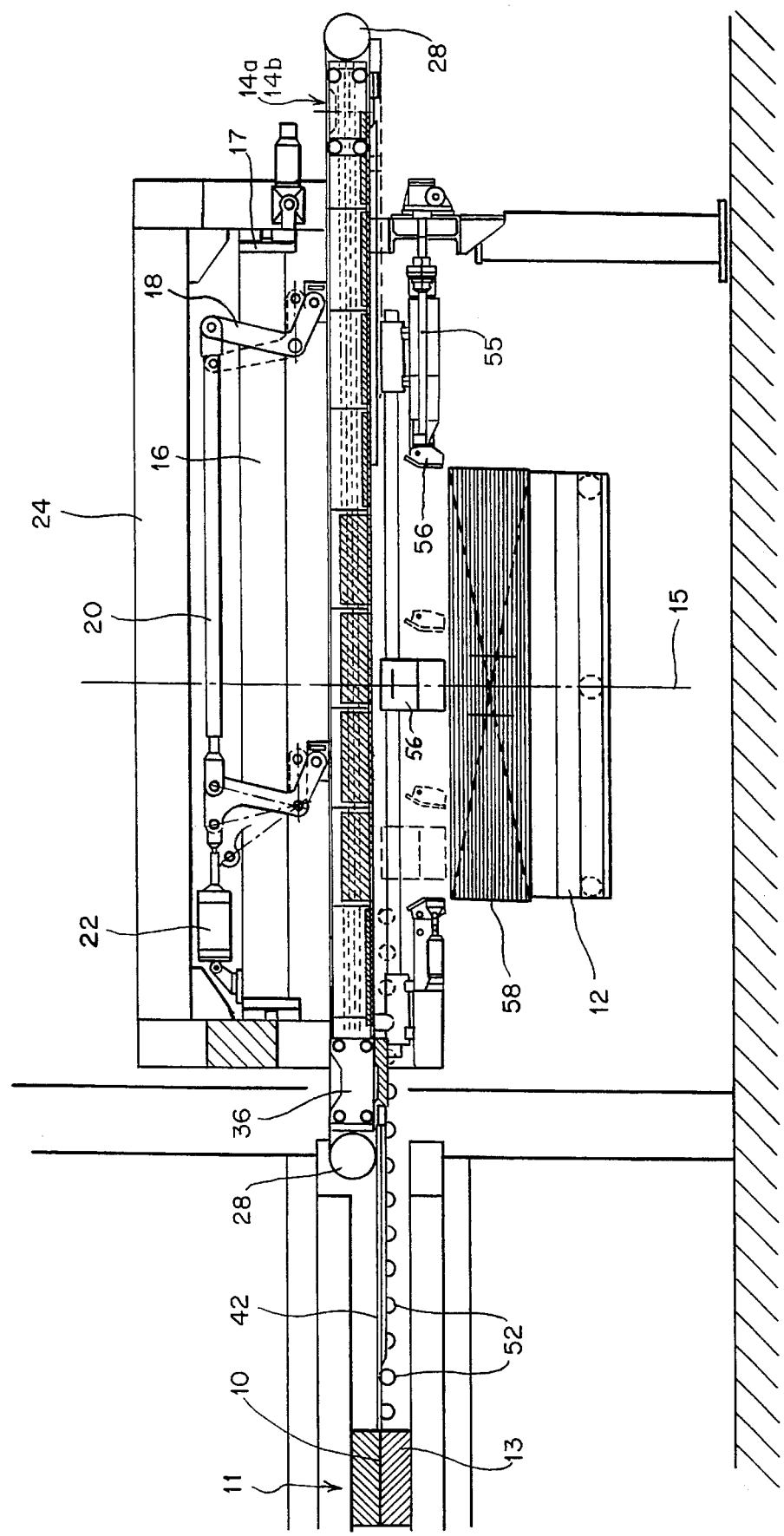
FIG. 1 is a side elevational view, partly in section, of the installation of the present invention.

Referring now to the drawings, there is shown an installation for handling the conveyance of blank 10 from cutting machine 11 to stacking device 12. The cutting machine in the illustrated embodiment is a stamping press only diagrammatically shown by cutting jaws 13 for stamping blanks 10 out of a steel sheet and having a discharge table comprising roller conveyor 52 extending in a plane towards stacking device 12. The installation comprises four identical cyclically operable conveyors 14a, 14b, 14c, 14d (see FIG. 2) programmed to convey blank 10 from the discharge table to a position above stacking device 12 and centered on axis 15 of the stacking device, and to stop in this position before releasing the blank. Means 42 is connected to the conveyor for pulling blank 10 out of cutting machine 11 and for moving the removed blank to stacking device 12 with the conveyor.

Each conveyor comprises a mobile element shown to be carriage 36 affixed to endless conveyor band or belt 30 trained about pulleys 28, the carriage being capable of traversing a path having one end closest to cutting machine 11 and an opposite end remote therefrom. The blank removing means comprises arm 42 connected to the mobile mechanism of the conveyor and having a free end, and gripping element 44, 46 mounted on the free end of arm 42 for seizing blank 10 at an edge thereof when the mobile element is at the end of the path closest to the cutting machine. Endless band 30 has a lower course extending in a plane slightly above the plane of the discharge table of the cutting machine (see FIG. 1), and carriage 36 supporting gripping arm 42 is affixed to the lower endless band course and extends therebelow in alignment with the plane of the discharge table.

Figure 2:
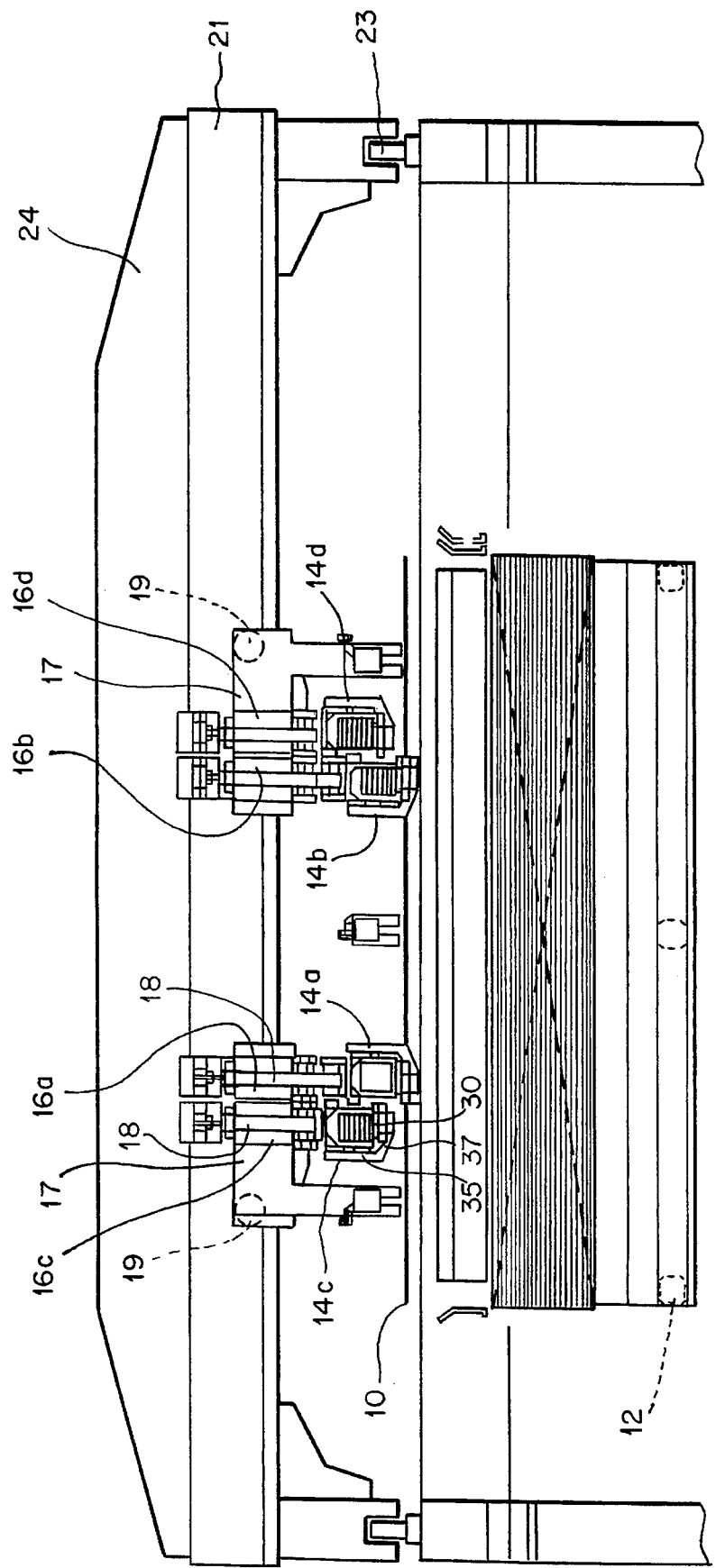
FIG. 2 is an end view showing the conveyor arrangement and stacking device of the installation.

As shown in FIGS. 1 and 2, each conveyor 14a, 14b, 14c, 14d is suspended from respective girder 16a, 16b, 16c, 16d by a lever system. Each lever system comprises a pair of bell crank levers 18 interconnected by connecting rod 20 and actuated by jack 22 for lifting and lowering the conveyor. At their opposite ends, girders 16a and 16c, on the one hand, and 16b and 16d, on the other hand, are paired by being affixed to crossbeams 17 which are equipped with rollers 19 running on two parallel girders 21 of portal 24. At least one of the rollers is power-driven to enable the pairs of conveyors to be displaced perpendicularly to the direction of transfer of blanks 10 from cutting machine 11 to stacking device 12. Portal 24 itself is mounted on rollers 23, at least some of which are power-driven, to enable the entire conveyor assembly to be displaced so that the installation may be serviced and/or repaired.

Each conveyor 14a, 14b, 14c, 14d further comprises means 32 actuatable for selectively holding blank 10 flat against the lower endless band course along the path of the mobile element and for releasing the blank in this position centered about axis 15 above the stacking device. The illustrated actuatable means comprises magnets.

As best shown in FIG. 4, each conveyor comprises elongated frame 26 constituted by a girder of reverse U shape whose open bottom is closed by stainless steel sheet 27 bolted to the frame girder at 29. Pulley 28 is mounted at each end of frame 26 and endless band 30 is trained over the two pulleys, one of which is power-driven to entrain the endless conveyor band, the tension of conveyor band 30 being sufficient to press the lower course of the conveyor band flat against bottom steel sheet 27. Electromagnets 32 are mounted in the interior of conveyor frame 26 in the center area of the conveyor above stacking device 12 while permanent magnets 34 are lodged in the interior of the conveyor frame at the respective ends thereof. As long as the electromagnets are energized, they will hold blanks 10 flat on the conveyor. When de-energized, they will release the blanks to place them on stack 58 on stacking device 12.

Guide rails 40 are affixed to conveyor frame 26 by brackets 39 welded to the conveyor frame at 41. The guide rails extend along the conveyor frame and carriage 36 supporting gripper arm 42 is displaceable on guide rails. Carriage 36 is of L-shaped cross section having vertical leg 35 and horizontal leg 37. Elongated frame 26 supports endless band 30 and has opposite sides extending perpendicularly thereto and substantially parallel to vertical carriage leg 35, guide rails 40 being affixed to one of the conveyor frame sides and vertical carriage leg 35 carrying four rollers 38 rolling on guide rails 40. Horizontal carriage leg 37 extends below the lower endless band course and is affixed to the lower course of endless conveyor band 30 by any suitable means, such as screws, rivets or adhesive bonding. It supports arm 42 which extends from the conveyor towards cutting machine 11 in a direction parallel to the direction of conveyance of blanks 10.

Figure 5:
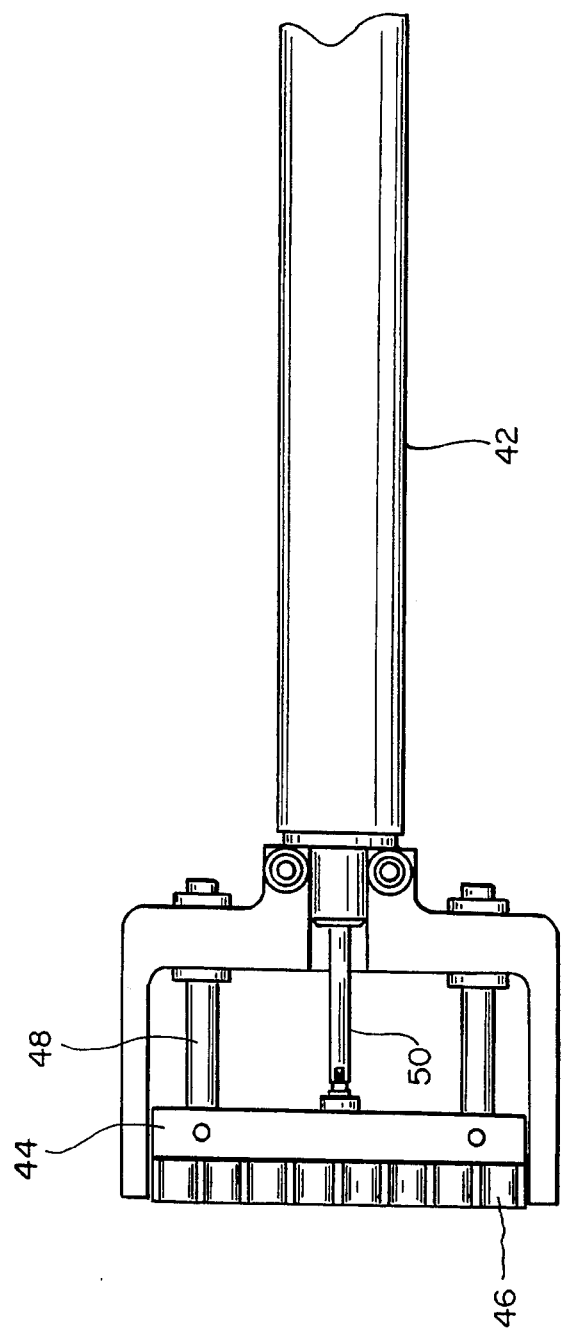
FIG. 5 is an enlarged plan view of the gripper arm of the conveyor.
Figure 6:
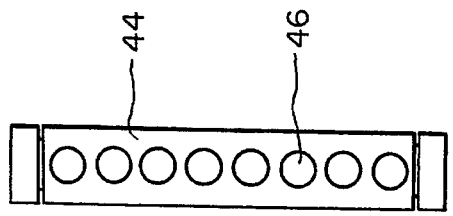
FIG. 6 is an end view of the gripper arm of FIG. 5.

As best shown in FIG. 5, gripping arm 42 is a hollow rod whose free end is fork-shaped and carries a gripping element for seizing blank 10 at an edge thereof. The gripping element comprises bar 44 supporting an array of magnets 46 arranged to contact the edge of the blank. Support bar 44 is displaceably mounted on guide rods 48 extending between the prongs of the fork-shaped free end of arm 42 parallel thereto for displacement longitudinally at the free end of the arm with respect thereto between a forward end position (shown in FIG. 5), wherein magnets 46 contact the edge of the blank and seize the same, and a retracted rest position. Pull rod 50 is attached to support bar 44 and extends into the interior of hollow arm 42, a jack 43 (shown in FIG. 3) mounted on carriage 36 being connected to the opposite end of the pull rod for displacement of support bar 44 between the illustrated forwarded position and the retracted end position in which the front face of the magnets is slightly in back of the free end of the prongs of the hollow gripper arm. When support bar 44 carrying magnets 46 is in its retracted position, the free ends of the prongs of the fork-shaped end of gripper arm 42 will act as stops for the edge of blank 10, thus stripping the blank from the magnets and causing it to be released. The length of gripper arm 42 is so selected that its free end with magnets 46 may contact the edge of blank 10 in cutting machine 11 when carriage 36 is at the end of the conveyor closest to the cutting machine, as shown in FIG. 1.

Cutting press 11 is equipped with a non-illustrated feeding system for the strip of sheet metal from which blanks 10 are cut as the strip is advanced step-by-step through the cutting press. In conventional cutting machines, the feeding system also ejects each cut blank. As clearly shown in FIG. 1, roller conveyor 52 on the discharge table of the cutting machine extends beyond the end of conveyors 14a, 14b, 14c, 14d and its support plane extends a little below the plane of the lower course of endless conveyor band 30. Peripheral grooves are defined in the rollers of roller conveyor 52 to receive the free ends of gripper arms 42.

The pair of conveyors 14a, 14b, on the one hand, and the pair of conveyors 14c, 14d, on the other hand, all of which extend parallel to each other, are programmed to operate simultaneously and in synchronism to convey a respective one of the blanks from the discharge table to a position above the stacking device and to stop in this position before releasing the blank, and the two pairs of conveyors operate alternately. The spacing between the conveyors of each pair is selected as a function of the length of blank 10, i.e. the dimension extending perpendicularly to the direction of conveyance. This spacing is controlled by displacing girders 16.

The installation operates in the following manner:

As soon as blank 10 has been cut from the sheet metal strip and the cutting press has been opened, the blank is attracted by magnets 46 at the free end of gripper arms 42, for example of conveyors 14a, 14b, which have been swung forward into a "ready" position close to the adjacent edge of blank 10 in the cutting machine, i.e. a distance of a few millimeters from the blank edge. This causes the edge of the blank to become attached to magnets 46 on support bars 44 of the two gripper arms. The endless conveyor bands are then set in motion so that the blank is pulled out of the cutting press by the gripper arms. At first, the blank is supported on roller conveyor 52 of the discharge table as it is conveyed towards stacking device 12. As endless conveyor bands 30 retract gripper arms 42 and pull them underneath the conveyors, permanent magnets 34 and then energized electromagnets 32 housed in frames 26 of the conveyors attract blank 10 and press it flat against the lower course of the endless conveyor bands whose further movement conveys the blank to stacking device 12. When the blank is centered on axis 15 of the stacking device, support bars 44 are retracted by pull rods 50 and electromagnets 32 are de-energized to release the blank and to permit it to drop on stack 58. The operating cycle is so programmed that the mobile mechanisms of the conveyors are stopped and the electromagnets are de-energized in this position, the stacking zone being delimited by guides 56 along the periphery of this zone. As schematically shown in FIG. 1, the position of guides 56 may be regulated by jacks 55 to which the guides are attached, thus enabling blanks of different dimensions and/or configurations to be stacked.

The hereinabove described installation is designed to serve a cutting machine whose feeding rhythm exceeds that of the pairs of conveyors 14a, 14b and 14c, 14d. While the pair of conveyors 14a, 14b pulls the blank out of the cutting machine and conveys it to stacking device 12, and to avoid any interference between the conveyors during their respective operating stages, the other pair of conveyors which go through their return stroke, are lifted by lever system 18, 20, 22 (see conveyors 14c, 14d in FIG. 2). After the blank conveyed by the pair of conveyors 14a, 14b has been placed on stack 58, they are lifted and conveyors 14c, 14d are lowered to align arm 42 with the plane defined by roller conveyor 52. As soon as blank 10 has been cut by cutting machine 11, it is gripped by the arm and the pair of conveyors 14c, 14d moves the pulled-out blank to the stack while lifted conveyors 14a, 14b are moved in the reverse direction in a return stroke which brings arm 42 into the position in which it is ready to grip and pull out the next cut blank.

Because of the disclosed arrangement, the conveyance of blanks 10 from cutting machine 11 to stacking device 12 is totally independent of the operating cycle of the feeding system for the cutting machine. In addition, there is no possibility of the blank moving in relation to the conveyor during conveyance so that each blank 10 is always in exactly the same position when the conveyor is stopped. Furthermore, the blank handling mechanism is totally independent of the feeding system and it is, therefore, possible to dispose conveyors 14a, 14b, 14c, 14d either in the same direction as the sheet metal strip fed to the cutting machine, or perpendicularly thereto, which facilitates the placement of the stacking device.

What is claimed is:

1. An installation for handling the conveyance of a blank from a cutting machine to a stacking device, the cutting machine having a discharge table extending in a plane, comprising at least one cyclically operable conveyor programmed to convey the blank from the discharge table to a position above the stacking device and to stop in said position before releasing the blank, the conveyor comprising a mobile element capable of traversing a path having one end closest to the cutting machine and an opposite end remote therefrom, and means connected to the conveyor for pulling the blank out of the cutting machine and for moving the blank to the stacking device with the conveyor, the blank pulling means comprising an arm connected to the mobile element of the conveyor and having a free end, and a gripping element mounted on the free end of the arm for seizing the blank at an edge thereof when the mobile element is at the end of the path closest to the cutting machine.

2. The installation of claim 1, comprising a plurality of said cyclically operable conveyors extending parallel to each other and programmed alternately to convey a respective one of the blanks from the discharge table to a position above the stacking device and to stop in said position before releasing the blank, each one of the conveyors having the means for pulling the blank out of the cutting machine and for moving the pulled-out blank to the stacking device, and further comprising a lever system supporting each conveyor for raising and lowering the conveyor.

3. The installation of claim 1, wherein the mobile the conveyor comprises an endless band having a lower course extending in a plane slightly above the plane of the discharge table of the cutting machine, and the mobile element is affixed to the lower endless band course and the arm extends therebelow in a plane coextensive with the plane of the discharge table, the conveyor further comprising means actuatable for selectively holding the blank flat against the lower endless band course along at least part of the path of the mobile element and for releasing the blank in said position above the stacking device.

4. The installation of claim 3, wherein the actuatable means comprises magnets.

5. The installation of claim 3, wherein the conveyor comprises an elongated frame and guide rails affixed thereto and extending therealong, the mobile element being a carriage supporting the arm and displaceable on the guide rails.

6. The installation of claim 5, wherein the carriage is of L-shaped cross section having a vertical leg and a horizontal leg, the conveyor frame has endless band and has opposite sides extending perpendicularly thereto and substantially parallel to the vertical leg of the carriage, the guide rails are affixed to one of the conveyor frame sides, the vertical carriage leg carries rollers rolling on the guide rails, and the horizontal carriage leg is affixed to the lower endless band course and supports the arm.

7. The installation of claim 1, wherein the gripping element mounted on the free end of the arm for seizing the blank at an edge thereof comprises magnetic means arranged to contact the edge.

8. The installation of claim 7, further comprising a support for the magnetic means, the support being displaceable in a direction parallel to a longitudinal axis of the arm with respect thereto between a forward end position wherein the magnetic means contacts the edge of the blank and seizes the same and a retracted rest position.

9. The installation of claim 1, comprising a plurality of said cyclically operable conveyors extending parallel to each other and programmed in synchronism to convey a blank from the discharge table to a position above the stacking device and to stop in said position before releasing the blank, and each one of the conveyors having the means for pulling the blank out of the cutting machine and for moving the pulled-out blank to the stacking device.

* * * * *